N. LUNDIN.
SAW GUIDE FOR TIMBER CUTTERS.
APPLICATION FILED APR. 26, 1919.
1,327,054.
Patented Jan. 6, 1920.
2 SHEETS—SHEET 1.
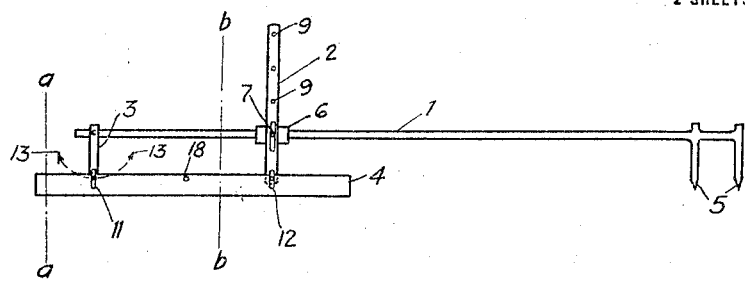
FIG. I
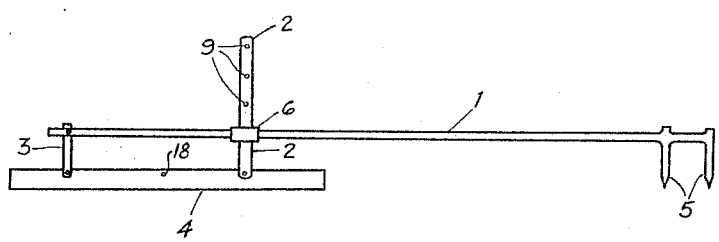
FIG. II
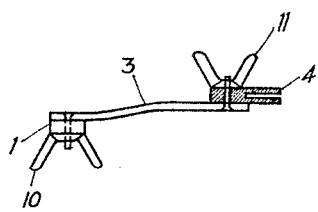
FIG. III
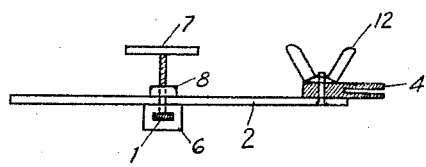
FIG. IV
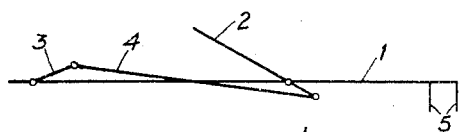
FIG. VIII
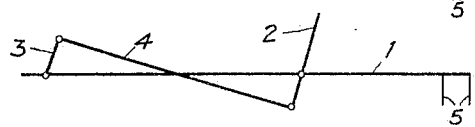
FIG. IX
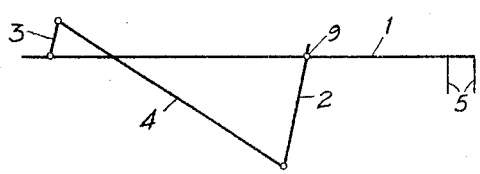
FIG. X
INVENTOR
Nils Lundin
BY *CBGoldberg*
ATTORNEY N. LUNDIN.
SAW GUIDE FOR TIMBER CUTTERS.
APPLICATION FILED APR. 26, 1919.
1,327,054.
Patented Jan. 6, 1920.
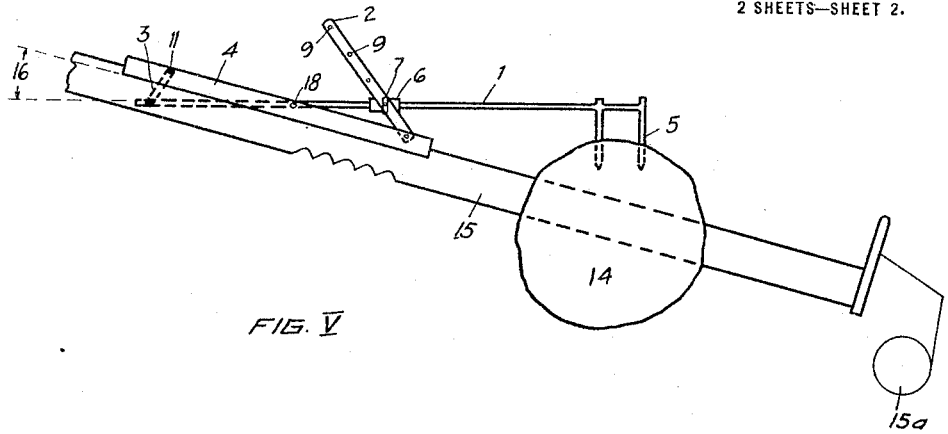
FIG. V
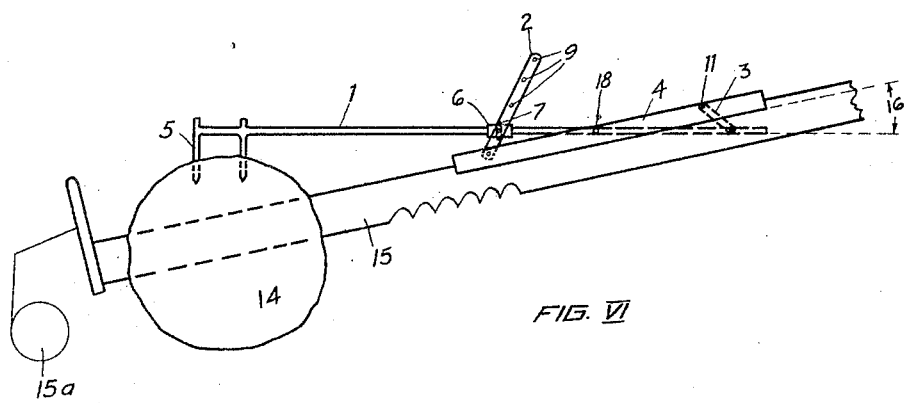
FIG. VI
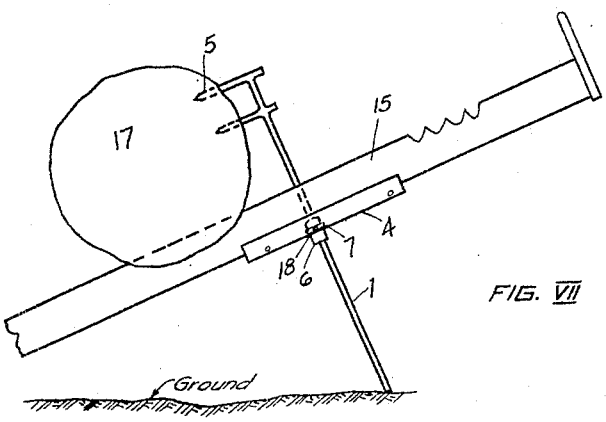
FIG. VII
INVENTOR
Nils Lundin
BY Goldberg
ATTORNEY

UNITED STATES PATENT OFFICE.

NILS LUNDIN, OF CLACKAMAS, OREGON.

SAW-GUIDE FOR TIMBER-CUTTERS.

1,327,054.  Specification of Letters Patent.  Patented Jan. 6, 1920.

Application filed April 26, 1919. Serial No. 292,874.

*To all whom it may concern:*

Be it known that I, NILS LUNDIN, a subject of the King of Sweden, residing at Clackamas, in the county of Clackamas and State of Oregon, have invented a new and useful Saw-Guide for Timber-Cutters, of which the following is a specification.

My invention relates to improvements in saw guides for cutting trees by hand while they are standing or where they have fallen in a certain position.

The objects of my invention are:

To make the timber cutter, *i. e.* the man who fells trees, independent of human assistance; to furnish a tool which can easily be manufactured, can be conveniently carried, installed and operated by one man, which is equally well adapted for use by a right handed or by a left handed man, and which also may be employed for cutting fallen trees from below, where such trees happen to be supported at both ends only, in which case a cutting from above would pinch the saw.

I attain these objects with the mechanism illustrated in the accompanying drawings in which—

Figure I is a plan view of the entire machine for a right handed man;

Fig. II is the same mechanism adapted for a lefthander;

Fig. III is a slightly enlarged section of Fig. I along the line *a—a;*

Fig. IV is a section through Fig. I along the line *b—b*, also slightly enlarged.

Fig. V illustrates the application of the device as illustrated in Fig. I to a standing tree;

Fig. VI illustrates the application of Fig. II to a standing tree in a manner different from that shown in Fig. V.

Fig. VII illustrates the adaptation of my apparatus for undercutting.

Figs. VIII, IX and X explain diagrammatically various ranges of my machine.

Similar numerals refer to similar parts throughout the several views.

Calling particular attention to Fig. I, we notice four separate and distinct members, the supporting bar 1, one long link 2, one short link 3, and the saw guide 4.

Said supporting bar 1 has, at one end, the spurs 5 intended to be driven into the trunk of a tree and to hold the bar rigidly in position. Slidably mounted on the bar is the sleeve 6 which latter is held in proper position by the set screw 7 (see also Fig. IV). The set screw 7 serves simultaneously as pivotal point for the long link 2, the check nut 8 being merely intended to furnish the counter bearing for said link. The extension of the link beyond the bar 1 contains a plurality of holes 9, the purpose of which will be explained later.

The short link 3 is pivoted to the upper surface of the bar and held in place by a thumb nut 10 at the underside of the bar. The slight bend in link 3, as noticed in Fig. III, compensates for the thickness of the sleeve 6 and brings the ends of both links to the same level.

The saw guide 4 is a flat piece of metal with a longitudinal slot in one edge for the reception of the back of an ordinary cross cut saw, it is pivoted to the upper surface of the links and held in place by the thumb nuts 11 and 12. With this arrangement the saw guide 4 is enabled to rotate the link 3 in the direction of the arrows 13 in Fig. I, and to assume the positions indicated by the diagrams Figs. VIII and IX.

The practical application of the device as illustrated in my mechanism is given in Fig. V. The bar 1 has been attached to the tree 14 and the saw 15 has been inserted into the saw guide 4. The timber cutter who takes his stand at the point 15ª can reciprocate the saw most conveniently with his right hand, having the other end of the saw slidably supported by the saw guide since the reaction created in the pivotal point 11 will keep the saw guide with its full length closely to the back of the saw. The angle 16 between bar 1 and guide 4 will be a minimum when the saw is set on to the tree and increase gradually as the saw enters into the tree. The maximum of this angle is attained when the links 2 and 3 have assumed the position indicated in Fig. IX, which is designed to sever trees of the usual diameter.

If an especially large tree is encountered the range of my apparatus can be increased by using one of the previously mentioned holes 9 as a pivotal point for the link 2. The possibilities in the increase of range by this method are visualized diagrammatically in Fig. X.

For a left handed workingman the same parts are used, only set together in a slightly different manner as pointed out in Fig. II. Here the links are attached to the underside of the bar and the saw guide to the underside of the links. If the bar be now attached to the tree with the saw guide uppermost, as shown in Fig. VI, it will be necessary for the workingman to take his position 15ᵃ at the opposite side of the tree where his left arm can be brought most forcefully into action in a manner different from that shown in Fig. V.

Fig. VII explains the application of my apparatus where a felled tree 17 happens to be supported at both ends, so that "undercutting" must be resorted to. In this case the links are entirely removed and the saw guide 4 with its extra hole 18 pivoted directly to the set screw 7 on the sleeve 6; thus not only serving as a guide for the saw, but also as a fulcrum by means of which the workman can apply the necessary pressure to the cut.

Having thus described my invention it will be seen that my objects have been accomplished and, though I have shown the preferred form of construction, I reserve to myself the right to make minor changes, providing I do not violate the spirit and principle of my invention.

I claim:

1. A tool for timber cutters comprising a flat metal bar having a longitudinal slot in one edge adapted to receive a saw, a supporting bar capable of positioning said flat metal bar with a tree, links detachably and interchangeably extending from the metal bar to the supporting bar, being pivoted to the lower side of the former and to the upper side of the latter and, by rotation around their respective pivotal points, holding said metal bar either parallelly or transversely to said supporting bar.

2. A tool for timber cutters comprising a saw guiding bar, a supporting bar adapted to hold the guiding bar adjacent to a tree, a short link removably connecting supporting and guiding bars, a long link removably and adjustably connecting the supporting and guiding bars, said links coöperating to hold the guiding bar transversely and at varying angles to said supporting bar.

3. A tool for timber cutters comprising a horizontal guiding bar having a longitudinal slot in the edge adapted to receive a saw, a cantaliver arm underneath said guiding bar having spurs at one end adapted to be attached to a tree, links operatively and reversibly connecting guiding bars and cantaliver arm to place the spurred end of the latter either to the right or to the left of the guiding bar.

4. A tool for timber cutters comprising a supporting bar having spurs at one end, a sleeve slidably mounted on the bar, an adjustable link on the sleeve, a link rotatably mounted at the other end of the bar, a saw guide pivoted to the ends of both links and capable, by rotating the end link, of assuming a transversal direction to the supporting bar.

5. A tool for timber cutters comprising a supporting arm, a saw guide operatively connected with the supporting arm and parallel to the latter but movable within a plane above said arm, links between supporting arm and saw guide, one of these links being capable of projecting to either side of arm and guide whereby the direction of the guide in relation to the arm is changed from parallel to transverse.

NILS LUNDIN.